United States Patent [19]  [11] 4,176,087
Dew et al.  [45] Nov. 27, 1979

[54] METHOD FOR ACTIVATING A HYDRODESULFURIZATION CATALYST

[75] Inventors: John N. Dew; Michael W. Britton; Eugene A. Harlacher, all of Ponca City, Okla.; Joseph A. Kleinpeter, McMurray, Pa.

[73] Assignee: Conoco Methanation Company, Stamford, Conn.

[21] Appl. No.: 808,013

[22] Filed: Jun. 20, 1977

[51] Int. Cl.$^2$ ............................................. B01J 27/02
[52] U.S. Cl. .................................................... 252/439
[58] Field of Search ........................................ 252/439

[56] References Cited

U.S. PATENT DOCUMENTS

| | | | |
|---|---|---|---|
| 3,061,421 | 10/1962 | Landau et al. | 48/197 |
| 3,890,113 | 6/1975 | Child et al. | 48/197 R |
| 3,915,894 | 10/1975 | Clements et al. | 252/439 |
| 3,986,984 | 10/1976 | Michalko | 252/439 |
| 4,008,180 | 2/1977 | Rausch | 252/439 |

FOREIGN PATENT DOCUMENTS 1324034  7/1973  United Kingdom .................. 252/439

OTHER PUBLICATIONS

Removal of Organic Sulphur from Coal Gas, S. P. Bhatia, Pulp and Paper Research Institute of Canada, The Canadian Journal of Chemical Engineering, vol. 49, Oct. 1971, pp. 605–610.

Primary Examiner—Delbert E. Gantz
Assistant Examiner—William G. Wright
Attorney, Agent, or Firm—W. A. Mikesell; F. L. Scott

[57] ABSTRACT

A method for activating a hydrodesulfurization catalyst by passing a gaseous stream comprising carbon oxides, hydrogen, and sulfur-containing compounds into contact with the catalyst at a temperature from about 400° to about 700° F. until the outlet gaseous stream from the catalyst has a sulfur content substantially equal to the sulfur content of the inlet gaseous stream and thereafter increasing the temperature incrementally and continuing to contact the catalyst with the inlet gas stream until the sulfur content in the outlet gaseous stream is substantially equal to the sulfur content of the inlet gaseous stream after each incremental temperature increase.

6 Claims, 1 Drawing Figure

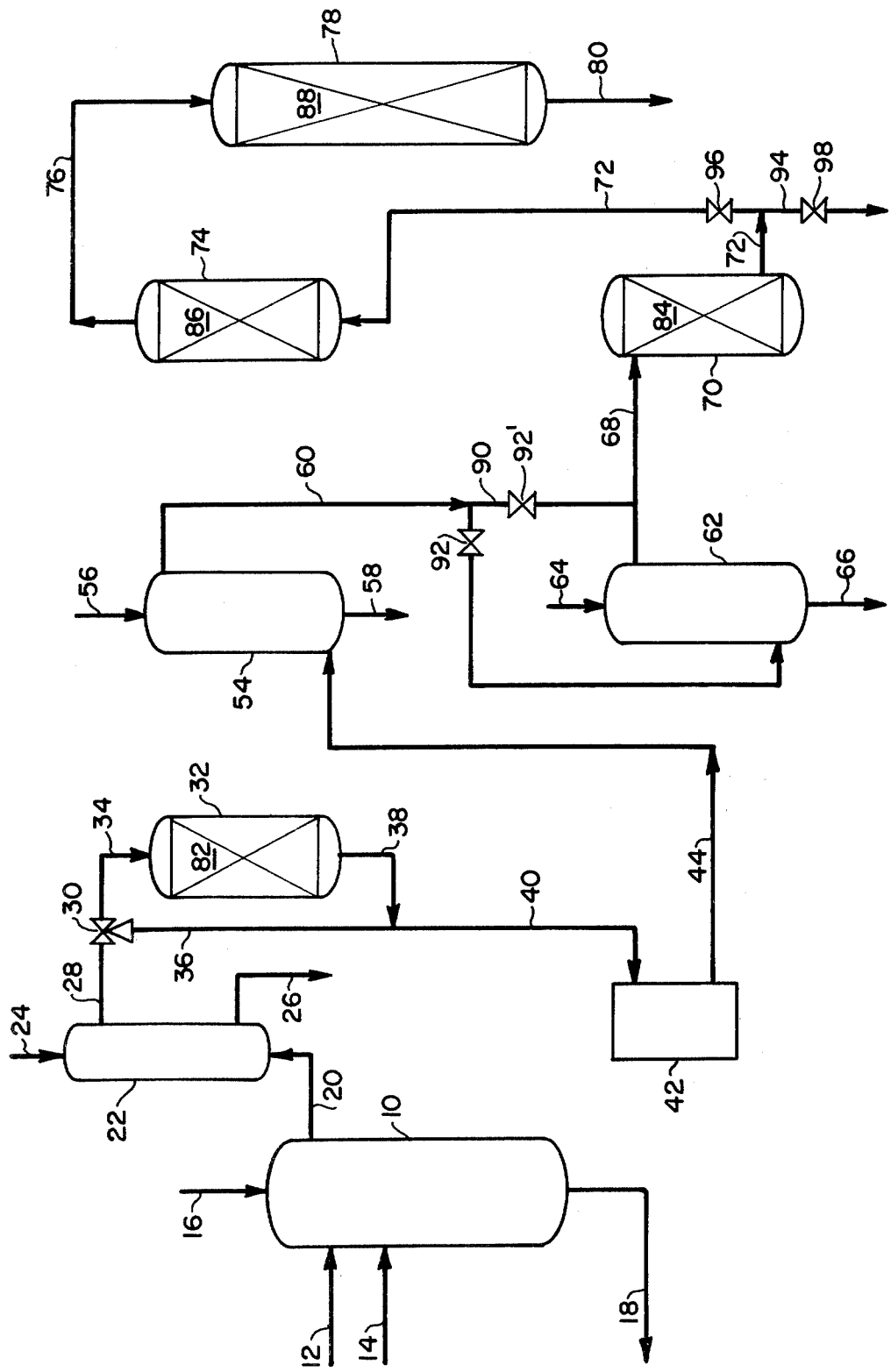

METHOD FOR ACTIVATING A HYDRODESULFURIZATION CATALYST

This invention relates to methods for activating hydrodesulfurization catalysts used in purifying gaseous streams containing sulfur-containing compounds.

In recent years it has become increasingly apparent that the demand for natural gas fuels has exceeded or will shortly exceed the supply available from naturally occurring sources. It has similarly become apparent that the use of petroleum as a feedstock for processes to produce synthetic natural gas is also undesirable since the supplies of petroleum are also limited and the cost is steadily increasing. As a result, a continuing effort has been devoted to the development of processes for producing synthetic natural gas from other carbonaceous materials which are more abundant such as coal and the like. Some such processes are shown in U.S. Pat. No. 3,854,895, issued Dec. 17, 1974 Muller; U.S. Pat. No. 3,890,113 issued June 17, 1975 to Child, et al. and U.S. Pat. No. 3,922,148 issued Nov. 25, 1975 to Child.

In such processes, a carbonaceous fluid is partially oxidized to produce a gaseous stream containing carbon monoxide and hydrogen. The gaseous stream also contains acid gas components such as carbon dioxide, hydrogen sulfide and the like, as well as water. In some instances, the gaseous stream is divided into two portions with one portion being passed to a shift reactor where the carbon monoxide and water are reacted to carbon dioxide and hydrogen. The reaction product comprising a hydrogen-rich stream is then optionally combined with the other portion of the carbon monoxide and hydrogen-containing stream with the resulting mixture being treated to remove the acid gases prior to passing the carbon monoxide/hydrogen mixture to the methanation reactor.

In the acid gas removal section, a commonly used process comprises the use of an alkaline solution to remove the acid gas components from the synthesis gas mixture followed by the use of a catalytic reactor to hydrogenate remaining sulfur compounds such as COS, $C_2S$, thiophenes, mercaptans and the like to hydrogen sulfide so that the sulfur-containing compounds may be removed by a subsequent operation such as a zinc oxide bed or the like. The catalysts used in such catalyst beds are those commonly used for hydrodesulfurization with some suitable catalysts being shown in U.S. Pat. No. 3,890,113, issued June 17, 1975 to Child, et al. Heretofore such catalysts have been activated for use in the conversion of the sulfur-containing compounds to hydrogen sulfide by the use of mixtures of hydrogen sulfide and hydrogen. It has been found to be undesirable to use mixtures containing carbon oxides since the hydrodesulfurization catalyst prior to sulfiding is an active methanation catalyst and tends to result in run-away methanation reactions in the sulfur conversion reactor resulting in undesirably high temperatures and the like.

Accordingly, a continuing search has been directed to improved methods for sulfiding the hydrodesulfurization catalyst used for the conversion of the sulfur-containing compounds in such a manner that pure gases, supplied from sources external to the process, are not required and in a manner such that runaway temperature and the formation of undesired compounds are avoided.

It has now been found that such an objective is accomplished by contacting the catalyst with an inlet gaseous stream comprising $H_2S$, carbon oxides and $H_2$ at temperatures from about 400° to about 700° F. (205° to 370° C.) and at a space velocity greater than about 500 hr$^{-1}$ until the outlet gaseous stream has a sulfur content substantially equal to the sulfur content of the inlet gaseous stream. The temperature is then increased by an incremental amount while continuing to contact the catalyst with the inlet gaseous stream until the outlet gaseous stream again has a sulfur content substantially equal to that of the inlet gaseous stream. The temperature of the catalyst bed is thus raised in incremental steps with the flow of the inlet gas being continued after each incremental temperature increase until the sulfur content of the outlet gaseous stream is substantially equal to that of the inlet gaseous stream.

The FIGURE is a schematic flowsheet of a methanation process.

In the FIGURE a gasifier 10 is shown equipped with a steam inlet 12, a carbonaceous fuel inlet 14, an oxygen supply 16, an ash removal 18 and a gaseous mixture outlet 20. The gaseous mixture so produced flows through outlet 20 to a water spray vessel 22 where it flows through vessel 22 countercurrently to a water stream injected through spray inlet 24 and recovered through a water outlet 26. The scrubbed gaseous mixture is recovered through a line 28 and passed to a splitter valve 30 where a portion is directed to a line 34 which is an inlet to a shift reactor 32 which contains a catalyst bed 82. The shifted gaseous mixture is recovered through an outlet 38 and passed to a line 36 where it is mixed with the other portion of the scrubbed gaseous mixture from the splitter valve 30. The combined mixtures are passed through a line 40 to a condenser 42 where a major portion of the water is removed from the mixture. The dried mixture then passes from the condenser 42 through a line 44 to an oil shower vessel 54 where it is contacted with an oil shower. Vessel 54 includes an oil inlet 56 and an oil recovery 58 whereby the oil stream flows countercurrently to the gaseous stream as it passes through vessel 54 and into an outlet 60 through which it passes to an aqueous alkaline scrubber vessel 62. Vessel 62 includes an alkaline solution inlet 64 and an alkaline solution outlet 66. The scrubbed synthesis gas mixture passes from vessel 62 via line 68 to a catalytic vessel 70 where any remaining sulfur compounds are converted to hydrogen sulfide over a hydrodesulfurization catalyst 84 positioned in vessel 70. The gaseous mixture is recovered from vessel 70 via a line 72 and passed to a zinc oxide scrubber 74 which contains a bed of zinc oxide 86. The purified mixture from vessel 74 is passed via a line 76 to a methanation reactor 78 containing a catalyst bed 88 of methanation catalyst over which the synthesis gas reacts to produce methane which is recovered through line 80.

By the process of the present invention, the catalyst in vessel 70 is activated by diverting the synthesis gas mixture after passage through vessel 54 to the inlet of vessel 70. Such is accomplished by closing valve 92 and opening valve 92' so that the gaseous mixture flows through line 90 into the inlet of vessel 70 bypassing vessel 62. The gaseous mixture flowing through vessel 70 is diverted to recovery or the like by closing valve 96 in line 72 and opening valve 98 in line 94.

The activation of the catalyst in vessel 70 has been a problem in the practice of processes such as described above since the catalyst used is normally a fairly effective methanation catalyst prior to sulfiding. The sulfiding operation is desirably conducted in a process stream since such streams are more readily available and because these streams offer certain economies of operation. Early attempts in this area were directed to the use of an acid gas stream recovered from the alkaline scrubber vessel. This stream proved to be unsuited to the activation of the catalyst since it appears that at least minor amounts of hydrogen are desirable in the gas passed to the catalyst bed for activation. Other attempts have been directed to the use of pure mixtures of hydrogen sulfide and hydrogen for activation. Obviously, such mixtures suffer no real problems with respect to runaway methanation and the like since no carbon oxides are present. The disadvantage, however, is that hydrogen sulfide streams are not produced by the present process in a pure condition and the streams mixed for use in activating the catalyst are external streams to the process. As a result, considerable effort has been directed to the development of a technique by which process streams could be used to sulfide and activate the catalyst used to convert sulfur-containing compounds in the synthesis gas stream to hydrogen sulfide. By the process of the present invention, it has been found that when vessel 70 is heated to a relatively low temperature from about 400° to about 700° F. (205° to 370° C.), the synthesis gas stream containing the sulfur-containing compounds normally occurring therein prior to the aqueous alkali scrubbing operation is effective as an activating gas. Even though this gaseous mixture contains carbon oxides, it has been found that, when relatively low temperatures as set forth above are used at a space velocity greater than about 500 hr$^{-1}$, very desirable results are achieved. The use of the relatively low temperatures and space velocities as set forth above, does not result in runaway methanation, the formation of the poisonous nickel carbonyl compounds, or the like.

The catalyst used in vessel 32 for the shift reaction is a similar type catalyst. However, no difficulty has been observed by Applicants in the practice of processes such as shown in the FIG. in this reactor. There appears to be little tendency for runaway methanation to occur at this point in the process. This catalyst is also heavily sulfided and since the inlet gaseous stream is sulfur-rich, the catalyst remains sulfided during normal operation. The catalyst in vessel 32 is readily sulfided initially using the method described herein with respect to the catalyst in vessel 70.

In reactor 70, no endothermic reactions of substance are occurring and in the event that methanation reactions begin to occur, the effect is quite rapid since further temperature increases increase the reaction rate to methane. Such methanation reactions are obviously undesirable in this vessel since the higher temperatures are undesirable. The catalyst used to convert the sulfur compounds to hydrogen sulfide can be operated at a temperature range from about 400° to about 700° F. (205° to 370° C.) although a temperature from about 425° to about 525° F. (210° to 275° C.) is preferred.

The activation of the catalyst used for converting the sulfur compounds to hydrogen sulfide at a desired temperature is accomplished by initiating activation at a temperature from about 400° to about 700° F. (205° to 370° C.) and continuing the injection of the inlet gas mixture until the sulfur content of the outlet gas mixture is substantially equal to the sulfur content of the inlet gas mixture. The temperature can then be raised by an incremental amount with the flow of the inlet gas being continued until the sulfur content of the outlet gas again reaches substantially the same level as that present in the inlet gaseous mixture. Obviously a plurality of such incremental temperature increases can be used depending upon the operating temperature desired, the size of temperature increments used and the like.

Reference to "substantially equal" as used herein means the presence of substantial quantities of sulfur in the outlet gaseous mixture. Values within 20% of the inlet sulfur value are considered to be substantially equal. The accuracy of test results on such streams by commonly used test methods is typically no better than ±10% and the variation in sulfur content of the gaseous mixture passing into the catalyst zone is also substantial in some instances. In any event, the breakthrough of sulfur in the outlet stream is the event of interest, i.e. the appearance of substantial amounts of sulfur in the outlet gaseous mixture. As the gaseous mixture passes through the catalyst, the sulfur compounds are consumed in sulfiding the catalyst until the catalyst is sulfided at the temperature and space velocity conditions used whereupon significant quantities of sulfur appear in the outlet gaseous mixture.

The temperature increments should be less than 200° F. (110° C.) and desirably vary from about 50° to 150° F. (28° to 85° C.) and preferably are from about 50° to about 100° F. (28° to 55° C.) depending upon the tendency of the particular mixture to react over the catalyst to form methane. The determination of the proper temperature increments is well within the skill of those skilled in the art and is dependent to a substantial extent upon the particular type catalyst used and the properties of the synthesis gas mixture used.

The gaseous mixture produced by the partial oxidation of the carbonaceous materials will normally contain carbon monoxide, carbon dioxide, methane, heavier hydrocarbons, water, and at least one sulfur compound selected from the group consisting of $C_2S$, $COS$, $H_2S$, thiopenes, mercaptans, and the like. Normally, all the sulfur compounds listed, and possibly other similar compounds, will be present in the gaseous mixture although the amount of sulfur compounds will vary from the time to time even under similar reaction conditions when using similar coal feed-stocks. Even more variable is the amount of each of the sulfur compounds with respect to time. In any event, the particular form of sulfur compound present is not considered significant so long as substantial amounts of sulfur-containing materials are present although it is considered highly desirable that some $H_2S$ be present. Most gaseous mixtures produced by the partial oxidation of carbonaceous solids such as coal will contain less than 3 weight percent sulfur although some such mixtures may contain as much as 5 weight percent sulfur. A considerable amount of the heavier and solid material carried over from gasifier 10 is removed in vessel 22 with additional amounts of heavy organic material being removed in vessel 42 and vessel 54. As a result, the gaseous mixture passing from vessel 54 typically comprises carbon monoxide, carbon dioxide, hydrogen, water, sulfur compounds such as $C_2S$, $COS$, $H_2S$, thiophenes, mercaptans and the like, methane, and possibly some heavier light hydrocarbons. It is obviously desirable that the sulfur-containing compounds be removed from the synthesis gas mixture prior to the passage of the synthesis gas mixture to the methanation reactor since sulfur is a well-known poison for methanation catalysts. The synthesis gas mixture normally contains from about 3,000 to about 6,000 parts per million sulfur in the form of hydrogen sulfide, COS, C$_2$S, mercaptans, thiophenes and the like prior to the aqueous alkaline scrubbing operation. The scrubbing reduces the sulfur content of the synthesis gas mixture substantially with values such as 200 parts per million being common after scrubbing. The gaseous mixture is then passed through a hydrodesulfurization catalyst to convert the remaining sulfur compounds to hydrogen sulfide. It is desirable that substantially all of the remaining sulfur compounds at this point be converted to hydrogen sulfide which is readily removed in the zinc oxide scrubber. Accordingly, it is highly desirable that the operation of the catalyst used to convert the sulfur-containing compounds to hydrogen sulfide be effective. While initial temperatures from about 400° to about 700° F. (205° to 370° C.) have been effective, it is preferred that the initial temperature be from about 425° to about 525° F. (210° to 275° C.) with the space velocity being greater than about 500 hr$^{-1}$. Normally, the space velocity need not exceed about 5000 hr$^{-1}$ and preferably the space velocity is from about 750 to about 1500 hr$^{-1}$. The use of space velocities greater than 5000 hr$^{-1}$ tends to result in "slippage", i.e. the gaseous mixture passes through the catalyst so quickly that the portions of the catalyst first contacted by the catalyst are not sulfided. Such "slippage" results in potential unwanted methanation over the unsulfided catalyst during normal operations.

The pressures used in the practice of the present invention can be varied from 1 atmosphere up to about 1000 p.s.i.g.

The catalyst used to convert the sulfur-containing compounds to hydrogen sulfide is selected from those catalysts commonly used for hydrodesulfurization operations. Such catalysts typically contain nickel, nickel compounds, cobalt, cobalt compounds, molybdenum, molybdenum compounds and the like either singly or in combination on a catalyst carrier such as keiselguhr, silica, alumina, or the like either singularly or in combination. Some such catalysts are described in U.S. Pat. No. 3,890,113 issued June 17, 1975 to Child, et al.

While the present invention has been described above with reference to certain of its preferred embodiments, it is pointed out that the descriptions above are illustrative rather than limiting in nature and that many variations and modifications are possible within the scope of the present invention. It is anticipated that many such variations and modifications may appear obvious and desirable to those skilled in the art upon a review of the foregoing description of preferred embodiments.

Having thus described the invention, we claim:

1. A method for sulfiding a hydrodesulfurization catalyst useful in reacting a sulfur-containing synthesis gas stream containing carbon oxides and hydrogen, said catalyst consisting essentially of at least one member selected from the group consisting of nickel, nickel compounds, cobalt, cobalt compounds, molybdenum and molybdenum compounds supported on a catalyst carrier material comprising at least one of the group consisting of aluminum oxides, silica, kaolin, and kieselguhr, said method consisting essentially of sequentially
  (a) passing an inlet gaseous stream comprising carbon oxides, H$_2$ and at least one sulfur-containing compound selected from the group consisting of H$_2$S, COS, C$_2$S, mercaptans and thiophenes, into contact with said catalyst at a temperature from about 400° to about 700° F. and a space velocity greater than about 500 hr$^{-1}$ until the outlet gaseous stream has a sulfur content substantially equal to the sulfur content of said inlet gaseous stream;
  (b) increasing the temperature in said catalyst bed incrementally, until a desired operating temperature is reached; and (c) further contacting said catalyst at said increased temperature which said inlet stream after each incremental temperature increase until said outlet gaseous stream again has a sulfur content substantially equal to the sulfur content of said inlet gaseous stream.

2. The method of claim 1 wherein said temperature is from about 425° to about 525° F. and wherein said space velocity is from about 750 to about 2500 hr$^{-1}$.

3. The method of claim 2 wherein said space velocity is from about 750 to about 1500 hr$^{-1}$.

4. The method of claim 1 wherein each said incremental temperature increase is less than 200° F.

5. The method of claim 4 wherein said incremental temperature increase is from about 50° to about 150° F.

6. The method of claim 1 wherein said temperature in said catalyst bed is increased in at least two incremental temperature increases.

* * * * *

UNITED STATES PATENT AND TRADEMARK OFFICE
CERTIFICATE OF CORRECTION

PATENT NO. : 4,176,087
DATED : November 27, 1979
INVENTOR(S) : John N. Dew et al.

It is certified that error appears in the above—identified patent and that said Letters Patent is hereby corrected as shown below:

Column 2, line 68, "conducted in a process" should read -- conducted with a process --.

Column 4, line 38, "thiopenes" should read -- thiophenes --.

Column 5, line 21, "about 1500 $hr^{-1}$." should read -- about 2500 $hr^{-1}$. Desirably the space velocity is from about 750 to about 1500 $hr^{-1}$. --

Column 6, line 28, "temperature which" should read -- temperature with --.

Signed and Sealed this

Eighteenth Day of March 1980

[SEAL]

Attest:

SIDNEY A. DIAMOND

Attesting Officer

Commissioner of Patents and Trademarks